United States Patent
Hodgson et al.

(10) Patent No.: US 9,599,003 B2
(45) Date of Patent: Mar. 21, 2017

(54) METHOD FOR OPERATING A METERING DEVICE, METERING DEVICE AND MOTOR VEHICLE

(71) Applicant: EMITEC GESELLSCHAFT FUER EMISSIONSTECHNOLOGIE MBH, Lohmar (DE)

(72) Inventors: Jan Hodgson, Troisdorf (DE); Peter Bauer, Siegburg (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/623,889

(22) Filed: Feb. 17, 2015

(65) Prior Publication Data
US 2015/0159536 A1 Jun. 11, 2015

Related U.S. Application Data

(63) Continuation of application No. PCT/EP2013/066670, filed on Aug. 9, 2013.

(30) Foreign Application Priority Data

Aug. 14, 2012 (DE) .................. 10 2012 107 430

(51) Int. Cl.
*F01N 11/00* (2006.01)
*F01N 3/20* (2006.01)

(52) U.S. Cl.
CPC .............. *F01N 11/00* (2013.01); *F01N 3/206* (2013.01); *F01N 3/208* (2013.01);
(Continued)

(58) Field of Classification Search
CPC ....... F01N 2610/1433; F01N 2610/144; F01N 2610/1466; F01N 2900/1806;
(Continued)

(56) References Cited

U.S. PATENT DOCUMENTS

| 6,912,846 B2 | 7/2005 | Huber et al. |
| 7,866,144 B2 | 1/2011 | Bakaj et al. |

(Continued)

FOREIGN PATENT DOCUMENTS

| DE | 10047516 A1 | 4/2002 |
| DE | 102009056181 A1 | 6/2011 |

(Continued)

OTHER PUBLICATIONS

Machine translation of DE102010030860A1, accessed on Jul. 26, 2016.*

(Continued)

*Primary Examiner* — Jonathan Matthias
(74) *Attorney, Agent, or Firm* — Laurence A. Greenberg; Werner H. Stemer; Ralph E. Locher

(57) ABSTRACT

A method for operating a metering device for a liquid additive includes providing the metering device with at least one pump having a movable pump element carrying out pumping movements to pump the liquid additive and at least one injector connected through a pressure line to a pressure side of the pump and being opened to meter the liquid additive. The injector is opened in a step a). In a step b), the liquid additive is then metered and the pumping movements are counted during metering. In a step c), the injector is then closed. In a step d), the number of pumping movements ascertained in step b) are then compared with the opening time of the injector between step a) and step c) in order to carry out a diagnosis of the operation of the metering device. A metering device and a motor vehicle are also provided.

16 Claims, 3 Drawing Sheets

(52) U.S. Cl.
CPC ...... *F01N 2550/05* (2013.01); *F01N 2610/01* (2013.01); *F01N 2610/144* (2013.01); *F01N 2610/146* (2013.01); *F01N 2610/1433* (2013.01); *F01N 2610/1453* (2013.01); *F01N 2610/1466* (2013.01); *F01N 2900/1806* (2013.01); *F01N 2900/1822* (2013.01); *Y02T 10/24* (2013.01)

(58) Field of Classification Search
CPC ...... F01N 2900/1822; F04B 2201/0207; F04B 2201/02071
See application file for complete search history.

(56) References Cited

U.S. PATENT DOCUMENTS

| | | | |
|---|---|---|---|
| 8,820,053 | B2 | 9/2014 | Hodgson et al. |
| 8,915,062 | B2 | 12/2014 | Wang et al. |
| 2004/0060286 | A1 | 4/2004 | Huber et al. |
| 2011/0083424 | A1* | 4/2011 | Wang ................ F01N 3/208 60/277 |
| 2012/0260632 | A1* | 10/2012 | Hodgson ............. F01N 3/206 60/274 |
| 2012/0324866 | A1 | 12/2012 | Hodgson et al. |
| 2013/0025268 | A1 | 1/2013 | Bauer et al. |

FOREIGN PATENT DOCUMENTS

| | | | |
|---|---|---|---|
| DE | 102010047506 A1 | 6/2011 | |
| DE | 102010004201 A1 | 7/2011 | |
| DE | 102010030860 A1 | 1/2012 | |
| DE | 102011101174 A1 * | 2/2012 | ............ F01N 3/208 |
| DE | 102010047516 A1 | 4/2012 | |
| KR | 20070063578 A | 6/2007 | |
| RU | 2418189 C2 | 5/2011 | |
| WO | 2011120839 A1 | 10/2011 | |

OTHER PUBLICATIONS

Machine translation of DE102011101174A1, accessed on Jul. 26, 2016.*

* cited by examiner

METHOD FOR OPERATING A METERING DEVICE, METERING DEVICE AND MOTOR VEHICLE

CROSS-REFERENCE TO RELATED APPLICATION

This is a continuation, under 35 U.S.C. §120, of copending International Application No. PCT/EP2013/066670, filed Aug. 9, 2013, which designated the United States; this application also claims the priority, under 35 U.S.C. §119, of German Patent Application DE 10 2012 107 430.5, filed Aug. 14, 2012; the prior applications are herewith incorporated by reference in their entirety.

BACKGROUND OF THE INVENTION

Field of the Invention

The invention relates to a method for operating a metering device for a liquid additive. A metering device for a liquid additive is used in the motor vehicle sector, for example, to feed a liquid additive into an exhaust gas treatment device of an internal combustion engine. The invention also relates to a metering device and a motor vehicle.

Exhaust gas treatment devices to which a liquid additive is fed are widely used in the motor vehicle sector. The method of selective catalytic reduction (SCR method) is carried out, for example, in exhaust gas treatment devices of that kind. In that method, nitrogen oxide components in the exhaust gas from the internal combustion engine are reduced to harmless substances, such as nitrogen, water and carbon dioxide, with the aid of a reducing agent. Ammonia is often used as a reducing agent for that purpose. In motor vehicles, ammonia is often not stored directly but in the form of a reducing agent precursor solution. One reducing agent precursor solution for that purpose which is used particularly frequently is aqueous urea solution. A 32.5% aqueous urea solution is available under the trademark AdBlue®, for example. That reducing agent precursor solution can be made available as a liquid additive from a tank by using a metering device and then converted to ammonia in the exhaust gas within the exhaust gas treatment device and/or outside the exhaust gas in a reactor specially provided for that purpose. In the text which follows, the term "additive" includes such reducing agents or reducing agent precursors, in particular.

For successful operation of an exhaust gas treatment device, it is desired that the liquid additive should be made available reliably and in a manner accurately metered by the metering device. In particular, accurately apportioned metering according to requirements is desired. At the same time, a metering device for a liquid additive should be as inexpensive as possible. The components (e.g. pumps, valves and sensors) provided to achieve accurate and reliable metering in the metering device should be as few and as simple as possible.

One problem which often occurs in the operation of metering devices for liquid additives is air bubbles in the metering device. On one hand, air bubbles in the metering device change the quantity of liquid additive delivered by the metering device, making accurate metering impossible if the liquid additive in the metering device contains air bubbles. On the other hand, air bubbles may also hinder or even prevent delivery overall, especially if the pump for pumping the liquid additive is not capable of pumping air in the same way as or in a comparable way to liquid additive. That is particularly the case with inexpensive pumps, which are preferably used in metering devices for liquid additive for reasons of cost.

SUMMARY OF THE INVENTION

It is accordingly an object of the invention to provide a method for operating a metering device, a metering device and a motor vehicle, which overcome, solve or at least mitigate the highlighted technical problems of the hereinafore-mentioned disadvantages of the heretofore-known methods, devices and vehicles of this general type. In particular, the intention is to describe a method for operating a metering device for a liquid additive which allows particularly high metering accuracy and particularly high reliability, even with metering devices produced at low cost.

With the foregoing and other objects in view there is provided, in accordance with the invention, a method for operating a metering device for a liquid additive, which comprises:

providing at least one pump which has a movable pump element and which performs delivery movements in order to pump the liquid additive, and at least one injector which is connected to a pressure side of the pump by a pressure line and which can be opened in order to meter the liquid additive;
a) opening the injector;
b) metering liquid additive and counting the delivery movements during the metering process;
c) closing the injector; and
d) comparing the number of the delivery movements ascertained in step b) with the opening time of the injector between step a) and step c) in order to diagnose the operation of the metering device.

The metering device which can be operated by the method described herein is constructed and set up especially to take liquid additive (particularly aqueous urea solution) from a tank and to feed it into an exhaust gas treatment device in predetermined portions. The pump of the metering device preferably has a suction side and a pressure side. In order to draw the liquid additive in from the tank, the suction side of the pump is connected to the tank by a suction line. Liquid additive can be drawn in through the suction line. A pressure line leading to an injector is connected to the pressure side of the pump. The injector can be used to control the discharge of the liquid additive. The injector can be disposed directly on an exhaust gas treatment device. It is also possible for a further line segment (outside the exhaust gas) to be disposed between the injector and an exhaust gas treatment device, allowing the injector to be disposed at a distance from the exhaust gas treatment device. Addition of the liquid additive metered into the exhaust gas treatment device by the injector is preferably accomplished by using a (passive) nozzle or an injection point which ensures uniform distribution or spraying of the liquid additive in an exhaust gas treatment device. The nozzle or injection point is preferably situated after the injector or between the injector and the exhaust gas treatment device, as seen from the pump in terms of flow.

The pump is preferably a pump which operates in a pulsed manner, the pump element of which performs delivery strokes as delivery movements for pumping. Delivery strokes are typical delivery movements in the sense according to the method described herein. During the delivery movement (or delivery strokes), the pump element is moved backward and forward in a range of movement, wherein a pump chamber is enlarged and reduced in size in a regular manner. While the pump chamber is becoming smaller, liquid additive flows toward the pressure side of the pump, out of the pump or out of the pump chamber of the pump. While the pump chamber volume is increasing in size, liquid additive flows into the pump or into the pump chamber, starting from the suction side of the pump. A valve is preferably provided on the suction side and/or on the pressure side of the pump, determining the direction of flow of the liquid medium through the pump. It is particularly preferred if the pump has a valve only on the pressure side and no valve is provided on the suction side, wherein the action of a valve on the suction side is achieved by appropriate configuration of the flow path of the liquid additive through the pump. A pump of this kind is particularly inexpensive and is therefore particularly advantageous for use in a metering device.

The movable pump element of the pump can be embodied as a piston or as a diaphragm, for example. A combined movable pump element formed of a piston, a diaphragm and a transmission device which transmits a movement of the piston to the diaphragm can also be used. A transmission device of this kind can, for example, be a solid (mechanical) transmission device (such as a tappet, a slide, a connecting rod or a cam structure) or a liquid transmission device, such as a transmission fluid. A transmission fluid can be displaced by a piston and in this way can move a diaphragm hydraulically. The movable pump element is preferably driven by a drive. This drive can be an electromagnetic linear drive, for example. This form of drive is particularly preferred because pumps with a drive of this kind are particularly inexpensive. However, it is also possible for some other drive, e.g. a rotary drive with a transmission device, to be used, wherein the transmission device converts the rotary motion of the rotary drive into a linear motion of the movable pump element.

It is also possible to use other pumps that perform delivery movements for pumping. The only point of importance for the method described herein is that the pump perform delivery movements which can be counted in some way. It is not important for the method described herein that pumping take place in a pulse-like or pulsed manner. For example, complete rotary motions of a rotary drive of a pump can be readily counted in order to implement the method described herein. Both positive displacement pumps and also dynamic pumps can have a drive which performs (countable) rotary motions for pumping.

The pump of the metering device for the method described herein is preferably dimensioned relative to the injector in such a way that a plurality of delivery movements greater than 5, preferably greater than 10 and particularly preferably greater than 20, is necessary for a (single) normal metering process with the injector (steps a) to c)).

Metering in the case of the metering device is preferably accomplished by (active or controlled) opening and closure of the injector. In this case, the time during which the injector is open is proportional to the metered quantity of liquid additive. For this purpose, the pressure in the pressure line between the pump and the injector is preferably set to a predetermined delivery pressure. This is achieved through suitable activation or control of the pump. A pressure sensor, through the use of which a control unit or controller can determine or monitor the pressure in the pressure line, is preferably provided on the pressure line. The control unit then controls the pump in accordance with the information from the pressure sensor. Given a defined pressure of the liquid additive in the pressure line and a constant opening cross section of the open injector and a constant viscosity of the liquid additive, the metered quantity of liquid additive is then proportional to the opening time of the injector between the opening of the injector and the closing of the injector. If the pressure sensor is disposed at a distance from the injector because there is, for example, a line segment between the pressure sensor and the injector, the pressure measured by the pressure sensor can be filtered or processed to determine the pressure at the injector for metering. Filtering/processing can be carried out in different ways, depending on the type of line segment. For example, filtering/processing can include attenuation and/or a time offset.

In steps a) to c) of the method, metering of the liquid additive is carried out with the aid of the injector in the manner described. In order to maintain the pressure in the pressure line of the metering device while the injector is open in step b), the pump pumps liquid additive into the pressure line and, for this purpose, performs delivery movements. According to step b), the number of delivery movements is determined during this process. It may be mentioned herein that an operating parameter of the metering device (and particularly of the drive of the pump) which is characteristic of or proportional to the number of pumping displacements can also be considered. In the case where, for example, small delivery movements are performed, counting of (complete) delivery movements may be sufficient for the system (for reasons of accuracy and/or for reasons of cost). Small delivery movements are possible particularly when the delivery movements are delivery strokes which are performed by a movable pump element. It is then possible to operate the pump with a partial stroke. In partial-stroke operation, no complete delivery strokes (from bottom dead center to top dead center) are performed. The movement of the movable pump element in a partial stroke can be referred to as a "small" delivery movement. Small delivery movements can be weighted appropriately when counting the delivery movements. For example, two small delivery movements can be counted as one "normal" delivery movement. It is also possible to disregard small delivery movements in counting the delivery movements. In addition and/or as an alternative, incremental consideration of a single delivery movement can also be considered, that is to say, for example, consideration of the partial steps of the drive of the pump during a single delivery stroke, ensuring that even more accurate monitoring of the movement of the pump element is achieved. A complete delivery stroke of a pump can be divided into a multiplicity of segments which each correspond to a certain quantity of liquid additive delivered and are each regarded as a "delivery movement" in the sense according to the method described herein. The above circumstances will apply in all cases below where the number of delivery movements is taken as a parameter.

For the comparison of the number of delivery movements of the pump element in step b) with the (actual and/or measured) opening time of the injector between step a) and step c), a metered quantity (comparison quantity or comparison number) corresponding to the opening time is calculated. This can also be accomplished, for example, with the aid of the following parameters:
  the pressure in the pressure line;
  the viscosity of the liquid additive;
  the opening cross section of the injector in the open state; and
  the opening time of the injector between step a) and step c).

The calculation of the corresponding data (comparison quantities or comparison numbers) can in part be determined or calculated in advance and stored as constant conversion parameters (or characteristic values or characteristic maps) and made available for retrieval in a control unit to enable the comparison quantities and/or comparison numbers to be determined quickly and with little computational effort in the course of the method.

Moreover, a delivery quantity corresponding to the number of delivery movements is determined as a further comparison quantity or comparison number, for example. The delivery quantity can be determined with the aid of the following parameters, for example:
- the pump chamber volume;
- a current and/or a voltage with which the pump and/or the injector are operated;
- control parameters of the pump, such as signal characteristics or characteristics for the current and/or voltage for operating the pump and/or the injector;
- if appropriate with the speed of a movable pump element during the performance of the delivery movements;
- the viscosity of the liquid additive; and
- the number of delivery movements.

These data also (comparison quantities or comparison numbers) can in part be determined or calculated in advance and stored as a characteristic value or characteristic map and made available for retrieval in a control unit.

As part of the comparison, two determined delivery quantities (or comparison quantities or comparison numbers), of which one is representative of the opening time of the injector and the other is representative of the delivery movements performed, are compared with one another. It is not necessary for both delivery quantities to be calculated explicitly: it is also possible for the delivery quantities to be compared with one another using appropriate equivalent variables. Thus, the terms "comparison quantity" and "comparison number" also stand for such equivalent variables. For example, a comparison procedure obtained when both pumping quantities are equated can be used.

By using the diagnosis performed by the comparison in step d), it is possible to ascertain whether a loss of liquid additive has occurred through the injector in the metering device, whether there is incorrect metering through the injector and/or whether there is a loss of delivery capacity or delivery pressure in the pump. In the comparison, a deviation between the comparison numbers or comparison quantities can be ascertained. If a significant deviation has been ascertained in step d), a correction of at least one operating parameter of the device can be performed, for example, in order to improve the operation of the metering device (especially the metering accuracy of the metering device). If a significant deviation is ascertained in step d), it is also possible for a fault signal for an onboard diagnostic system to be output.

In accordance with another mode of the method of the invention, method steps a) to c) are repeated with a number of repetitions before step d) is performed, wherein a number of comparisons corresponding to the number of repetitions is performed in step d) and wherein the comparisons are taken into account jointly in order to diagnose the operation of the metering device.

For example, method steps a) to c) can be performed between 5 and 20 times before method step d) is performed. An injector opening duration and a number of delivery movements performed is then stored for each execution of method steps a) to c), or respectively corresponding comparison quantities or comparison numbers are stored. These injector opening durations and numbers can then be compared with one another in step d), being considered jointly. In this way, it is possible, for example, to ascertain whether a metering error occurring in a uniform manner or a metering error repeated irregularly is occurring. Where applicable, it is also possible to detect that a fault has occurred only briefly and that therefore no correction measures have to be initiated.

A malfunction can be detected, for example, if an impermissible deviation in comparison quantities or comparison numbers occurs in a minimum proportion of the comparisons performed. If an impermissible deviation occurs in more than 30% of the comparisons, for example, a fault can be detected.

In this way, it is possible, for example, to prevent the onboard diagnostic system of a motor vehicle from outputting a fault message when in fact there is no permanent fault but only a temporary disturbance.

In accordance with a further preferred mode of the method of the invention, an explicit (or actual) quantity of liquid additive pumped between step a) and step c) is calculated in step d), using the number of delivery movements.

Information determined in this way on the quantity delivered can be used, for example, to check the metering accuracy of the injector. In regular (satisfactory) operation of the metering device, the metered quantity is specified by using the opening time of the injector. With the aid of the quantity calculated by using the delivery movements, an additional calibration of the injector can be carried out, for example, in order to update information on the correlation between the metered quantity and the opening time of the injector in a control unit and, if appropriate, to adapt it to changes in the metering device (e.g. due to aging phenomena in the components of the metering device).

In accordance with an added advantageous mode of the method of the invention, in step d), it is ascertained that there is air or gas in the metering device if the number of delivery movements or a parameter corresponding to the number is greater than a first limiting value.

In accordance with an additional preferred mode of the method of the invention, the first limiting value is defined in accordance with the opening time of the injector.

The first limiting value for the number of delivery movements and/or a parameter (PUMPING QUANTITY) corresponding to the number or to the steps of the delivery movements can be determined by using the metered quantity (METERED QUANTITY) determined by the opening time of the injector and using the delivery quantity, which normally corresponds to the delivery movements (that is to say when there is no air in the metering device). If the delivery quantity, which normally corresponds to the number of delivery movements, is more than 10% or more than 50% greater than the metered quantity, for example, it can be assumed that there is air in the metering device or in the pump of the metering device and/or in the pressure line. This is due to the fact that, in this case, the pump cannot develop its full delivery capacity due to the trapped air but at least in part merely compresses the air with the movable pump element as it performs the delivery movements, the air then expanding again. It is then impossible for the full pump chamber volume of the pump to be used to deliver liquid additive. A value for the deviation can be defined, for example, as a first limiting value (1 GW). Thus, the limiting value can be 1.5 times the delivery quantity determined by using the number of delivery movements, for example, in particular 1.3 times or even 1.1 times the delivery quantity. From this, the following relationship follows—if appropriate for 1 GW=1.2*PUMPING QUANTITY: if METERED QUANTITY<1 GW, air is detected or determined in the metering device from the nature of the system. By using this procedure, it is possible to detect air in the metering device without the need for additional sensors.

In accordance with again another advantageous mode of the method of the invention, the gas quantity in the metering device is determined by using the number of delivery movements.

In particular, this can be accomplished by comparing the delivery quantity that normally corresponds to the number of delivery movements (in the case of satisfactory operation) with the metered quantity corresponding to the opening time of the injector. The magnitude of the gas quantity is dependent on the ratio of the delivery quantity at the pump to the metered quantity at the injector. The gas quantity is typically an air bubble which has been drawn into the metering device. The size of the air bubble or the gas quantity in the metering device is regarded as proportional to this ratio, for example. It is also possible for a more complex calculation procedure (characteristic map) to be used to determine a size of an air bubble or a gas quantity from the number of delivery movements and the opening time of the injector. In this calculation procedure, it is also possible to additionally take into account at least one of the following parameters, for example:
  the viscosity of the liquid additive;
  the required metered quantity, from which the opening time of the injector is obtained;
  the pressure in the pressure line; and
  the viscosity of the air bubble or of the gas quantity.
It is thus possible in a particularly simple manner to estimate how large an air bubble or a gas quantity is in the metering device (in particular in the pump or the pressure line of the metering device). This information can then be taken into account or even used to determine a decision as to which measures are initiated to bleed the system.

In accordance with again a further advantageous mode of the method of the invention, degasification of the metering device is carried out if gas has been detected in the metering device.

In this case, the gas can be air and/or vapor (of the additive), in particular. By degasifying the metering device, it is possible to quickly reestablish the full delivery capacity or accurate operation of the metering device. In this case, the term "degasification" (or bleeding) is taken to mean that the proportion of gas in the liquid additive in the metering device is reduced by modified operation of the metering device. In particular, the first limiting value is undershot again after a degasification procedure has been carried out.

In accordance with again an added advantageous mode of the method of the invention, the metering device has a pressure line, which extends from the pump to the injector, and a return line, which branches off from the pressure line, wherein degasification takes place through the return line when the number of delivery movements is greater than a second limiting value and, otherwise, degasification takes place through the injector.

It has already been explained above that the presence of a gas quantity/air bubble can be ascertained from the fact that the number of delivery movements is greater than a first limiting value, which corresponds to a certain delivery quantity. It is now stated that a second limiting value is used to ascertain that the size/quantity of a gas quantity present in the metering device exceeds a certain value. This results from the fact that the number of delivery movements can be used to determine an actually present gas quantity/air quantity, as has likewise already been described above.

The metering device for liquid additive can now have a return line, which branches off from the pressure line and extends from the pressure line back to the tank. By using a return line of this kind, circulation of liquid additive is possible (e.g. in a flow direction through the suction line, the pump, the pressure line and the return line back into the tank). By using such circulation, gas or air present in the metering device can be pumped back into the tank without distorting the metering of the liquid additive at the injector. With such circulation, however, simultaneous metering of liquid additive through the injector may not be expedient because the pressure in the pressure line falls during the degasification procedure if a return valve by which the circulation through the return line is controlled is open. The return valve is preferably disposed in the return line as close as possible or directly behind the branching off of the return line from the pressure line.

As an alternative to the degasification described herein of a metering device by using a return line, it is also possible to pass the gas or air through the injector of the metering device. The gas is then pushed through the injector of the metering device together with liquid additive. Although, on one hand, with degasification in this way, metering operation with the injector does not have to be interrupted, the simultaneously emerging gas quantity passing through the injector leads to distortion of the metered quantity.

The approach of the further improvement, described herein, of the method is that it may be possible to accept this distortion at small volumes/quantities of the gas because it is relatively small. Bleeding then takes place through the injector, while regular operation of the metering device advantageously does not have to be interrupted. If the air bubble or gas quantity, in particular, exceeds a certain size, the incorrect metering of the liquid additive by the injector (caused by the gas quantity or by the air bubble) would be too great to allow it to be accepted as part of regular operation. In order to establish fault-free operation of the metering device as quickly as possible, degasification in this case takes place through the return line.

In accordance with again an additional advantageous mode of the method of the invention, a speed of the movable pump element is determined during step b), and the speed of the movable pump element is used in step d) to determine a pressure in the metering device.

During this process, it is preferably not the average speed of the movable pump element which is calculated, which would be obtained simply from the number of delivery movements and the time between steps a) and c). Instead, a speed of the movable pump element which is obtained during a single delivery movement on the basis of a driving force acting on the movable pump element is preferably determined. The higher the pressure in the pressure line, the slower the movable pump element moves when a constant driving force is exerted on the movable pump element. The pressure in the pressure line can therefore be determined particularly easily and inexpensively in the manner described by using the speed characteristic of the movable pump element (during a delivery movement).

If the pressure in the pressure line is determined by this methodology, it may be possible to dispense with an additional pressure sensor on the pressure line because the pressure in the pressure line can be detected within the pump itself.

If a gas quantity or an air bubble has been detected in the metering device (or in the pressure line) by using the method described herein, it is preferred if it is carried out of the metering device. Two different ways of carrying a gas quantity or an air bubble out of a metering device have already been discussed above. According to a first variant, the gas quantity can be expelled through the injector into the exhaust gas treatment device. According to a second variant, circulation can be performed, in which gas in the metering device is carried back into the tank for the liquid additive by a return line.

A particularly advantageous embodiment of the first variant will be described herein. A method for bleeding a metering device for liquid additive having a pump for pumping the liquid additive along a delivery line from a tank to an injector, at least having the following steps, is preferred:
  w) detecting a gas quantity or an air bubble in the delivery line;
  x) opening the injector;
  y) increasing an operating speed of the pump; and
  z) expelling the air bubble, wherein the increased operating speed of the pump increases the momentum of the liquid additive and the air in the delivery line.

This method can also be used independently of the other concepts described in this application and thus represents an independent improvement over the prior art. In the method, the injector is preferably opened immediately after an air bubble has been detected, and only then is the operating speed of the pump increased. It is thereby possible to ensure that the increased operating speed of the pump is used in full to accelerate the liquid additive and the air bubble in the delivery line and that there is only a slight pressure increase, if any, which occurs in the delivery line. The specific momentum of the liquid additive and of the air bubble is thereby maximized. The operating speed of the pump is preferably increased in step y) to an operating speed which is no more than 10 percent below the maximum operating speed of the pump. By using such a methodology, the liquid additive and the air bubble in the delivery line can be accelerated to such an extent that restraining forces on the air bubble in the delivery line are overcome by the specific momentum. Restraining forces can be capillary forces, for example, which act at the boundary surface between the liquid additive and the air bubble and hold the air bubble in the delivery line. The air bubble can as it were be torn out of the delivery line by the specific momentum.

With the objects of the invention in view, there is also provided a metering device for pumping a liquid additive from a tank into an exhaust gas treatment device, comprising at least one pump with a movable pump element which performs delivery movements in order to pump the liquid additive, at least one injector which is connected to a pressure side of the pump by a pressure line and which can be opened in order to meter the liquid additive, and a control unit or controller which is set up, programmed or configured to carry out the method described herein. For this purpose, the control unit is embodied with appropriate memory components, arithmetic components and data lines, in particular, wherein data lines leading (directly/indirectly) toward the pump, the injector and, where applicable, a pressure sensor are provided, in particular. In particular, the metering device is constructed and set up to pump and meter liquid aqueous urea solution.

With the objects of the invention in view, there is concomitantly provided a motor vehicle, comprising an internal combustion engine, an exhaust gas treatment device for cleaning the exhaust gases of the internal combustion engine, a tank for a liquid additive and a metering device, which has been described herein and is set up to feed the liquid additive in a metered manner out of the tank into the exhaust gas treatment device. The motor vehicle is, in particular, a passenger vehicle or truck having a diesel engine as an internal combustion engine, wherein the exhaust gas treatment device has an SCR catalytic converter, and aqueous urea solution is injected upstream of the SCR catalytic converter (where appropriate with the aid of a pressurized gas).

Other features which are considered as characteristic for the invention are set forth in the appended claims, noting that the features presented individually in the claims can be combined in any technologically feasible way and can be supplemented by explanatory material from the description, thereby leading to further variant embodiments of the invention.

Although the invention is illustrated and described herein as embodied in a method for operating a metering device, a metering device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Identical elements in the figures have been provided with identical reference signs, and therefore the explanations relating to individual figures are intended to be transferable also to identical elements and other figures. Attention is drawn to the fact that the combination of elements (component parts) in the figures should be regarded as "necessarily associated" only if this is explicitly indicated herein or another combination is clearly technically impossible. Accordingly, in many cases modifications in which component parts/functions from one figure are integrated (alternatively and/or cumulatively) into other variant embodiments are also possible within the scope of the invention.

Figure 1:
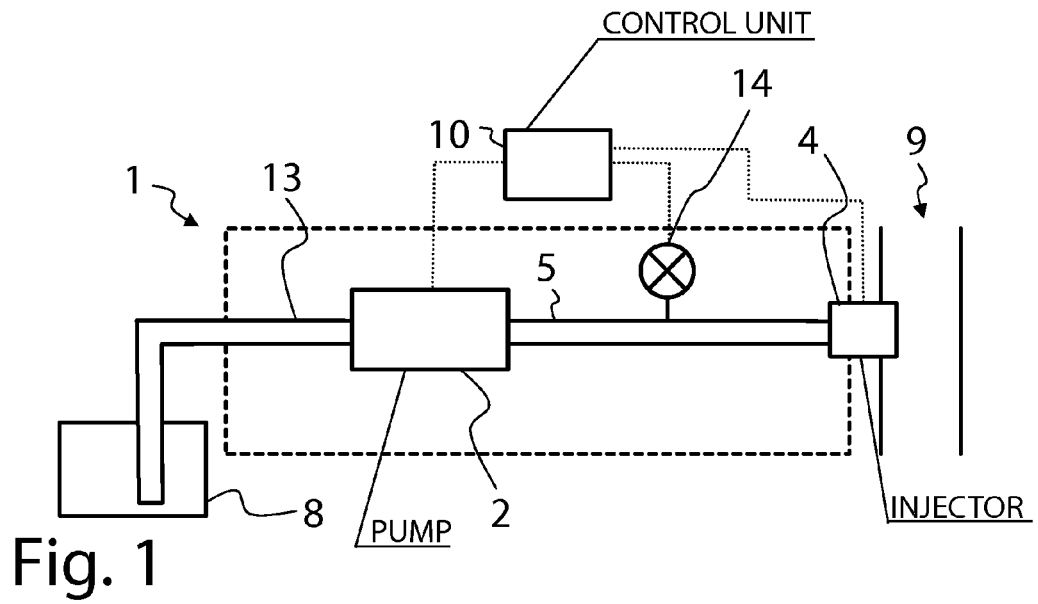
FIG. 1 is a block diagram of a first variant embodiment of a metering device for a liquid additive.
Figure 2:
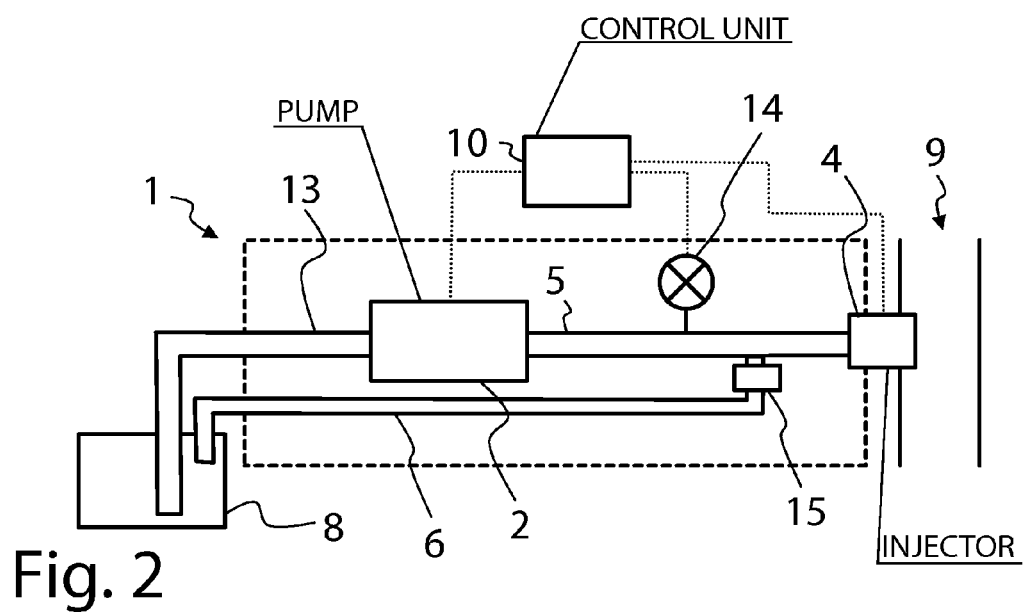
FIG. 2 is a block diagram of a second variant embodiment of a metering device for a liquid additive.

Referring now in detail to the figures of the drawing for explaining the invention and the technical field in more detail by showing particularly preferred structural variants to which the invention is not restricted and in which size ratios are diagrammatic, and first, particularly, to FIGS. 1 and 2 thereof, there are seen different variant embodiments of metering devices 1 which can be operated with the aid of the method described herein. The metering devices 1 each take liquid additive (in particular aqueous urea solution) from a tank 8 and conduct it to an exhaust gas treatment device 9. The metering devices 1 each have a pump 2, which is connected by a suction line 13 to the tank 8. The pump 2 is furthermore connected by a pressure line 5 to an injector 4, which is set up or configured to feed the liquid additive to the exhaust gas treatment device 9 in a metered manner. Adjoining the suction line 13 is a pressure sensor 14, through the use of which the pressure in the suction line 13 can be determined or monitored. The pump 2, the pressure sensor 14 and the injector 4 are connected to a control unit or controller 10, through the use of which the operation of the metering device 1 can be controlled or monitored.

The variant embodiment of a metering device shown in FIG. 2 additionally has a return line 6, which branches off from the pressure line 5 and through which degasification/bleeding of the metering device 1 can take place. The return line 6 has a return valve 15, through the use of which the return line 6 can be opened and closed.

Figure 3:
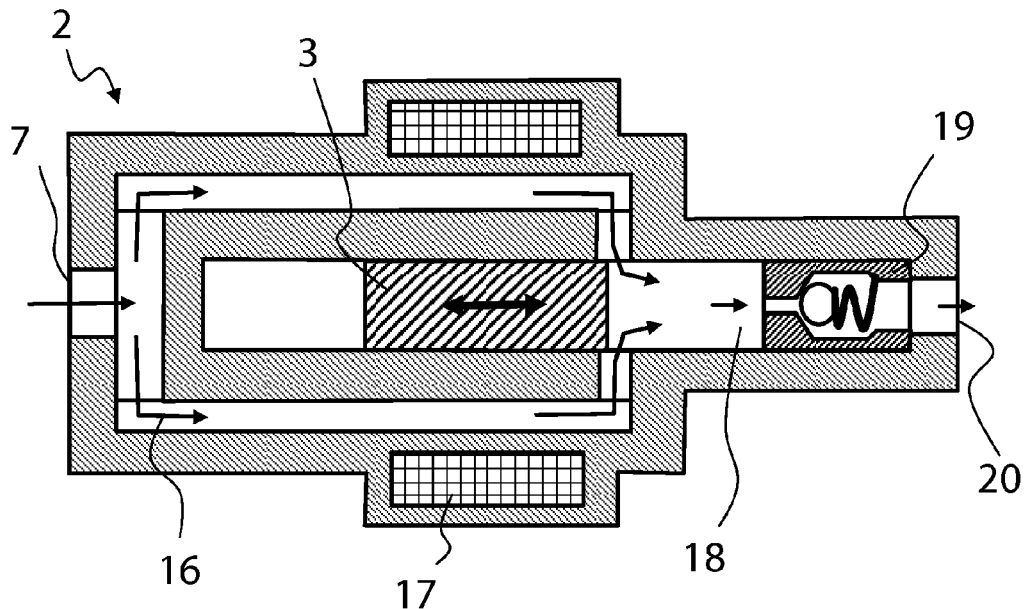
FIG. 3 is a diagrammatic, longitudinal-sectional view of a pump for a metering device.

FIG. 3 shows a pump 2. The pump has a movable pump element 3, which can perform movements, indicated by an arrow, in the form of delivery movements. During the delivery movements, the volume of a pump chamber 18 is increased and reduced. While the pump chamber volume is increasing, liquid additive flows from a suction side 7 of the pump into the pump chamber 18 along a flow path 16. While the pump chamber volume is decreasing, liquid additive flows out through a valve 19 in the direction of a pressure side 20 of the pump. The movable pump element 3 is driven by a drive 17, which is preferably embodied as an electromagnetic linear drive.

Figure 4:
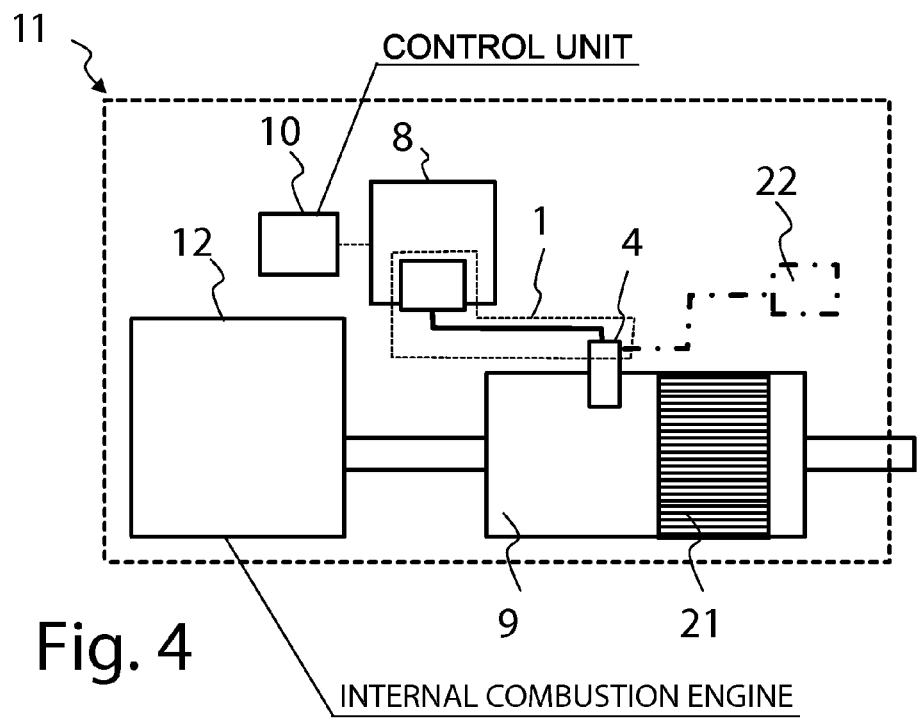
FIG. 4 is a schematic and block diagram of a motor vehicle having a metering device.

FIG. 4 shows a motor vehicle 11, having an internal combustion engine 12 and an exhaust gas treatment device 9 for cleaning the exhaust gases of the internal combustion engine 12. A liquid additive can be fed into the exhaust gas treatment device 9 by using a metering device 1. The metering device 1 has an injector 4, which controls the metering of the liquid additive (in particular aqueous urea solution fed upstream of an SCR catalytic converter 21) into the exhaust gas treatment device 9. The metering device 1 receives liquid additive from a tank 8 and is controlled by a control unit 10. If appropriate—as indicated therein in broken lines—a compressed air system 22 can also be provided, through the use of which the injection of additive is assisted, as is known to a person skilled in the art in this area.

Figure 5:
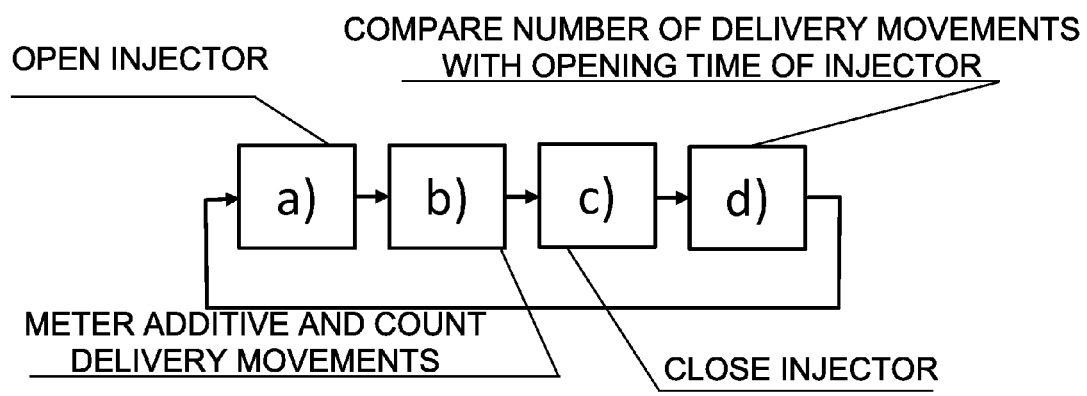
FIG. 5 is a flow diagram of the method described herein.

FIG. 5 shows a flow diagram of the method described herein. The flow diagram shows method steps a) to d), which are performed repeatedly in a regular way in the manner of a loop during the execution of the method described herein.

Through the use of the method described herein, it is possible to perform particularly accurate and particularly reliable operation of a metering device which can be constructed from especially inexpensive individual components because particularly advantageous control of the various components with one another is made possible.

The invention claimed is:

1. A method for operating a metering device for a liquid additive, the method comprising the following steps:
   providing at least one pump having a pressure side and having a movable pump element performing delivery movements to deliver the liquid additive;
   providing at least one injector configured to be opened to meter the liquid additive;
   providing a pressure line interconnecting the at least one injector and the pressure side of the at least one pump;
   a) opening the at least one injector during an opening time;
   b) metering liquid additive and counting a number of the delivery movements during the metering;
   c) closing the at least one injector;
   d) comparing the number of the delivery movements ascertained in step b) with the opening time of the at least one injector between step a) and step c) to diagnose operation of the metering device; and
   e) correcting at least one operating parameter of the metering device dependent on the comparison in step d).

2. The method according to claim 1, which further comprises:
   repeating steps a) to c) for a number of repetitions before performing step d);
   performing a number of comparisons in step d) corresponding to the number of repetitions; and
   taking the comparisons into account jointly to diagnose the operation of the metering device.

3. The method according to claim 1, which further comprises explicitly calculating, in step d), a quantity of liquid additive delivered between step a) and step c) using the number of delivery movements.

4. The method according to claim 1, which further comprises determining in step d) that there is gas in the metering device if the number of delivery movements or a parameter corresponding to the number of delivery movements is greater than a first limiting value.

5. The method according to claim 4, which further comprises defining the first limiting value in accordance with the opening time of the at least one injector.

6. The method according to claim 5, which further comprises determining a gas quantity in the metering device using the number of delivery movements.

7. The method according to claim 6, which further comprises bleeding the metering device if air has been detected in the metering device.

8. The method according to claim 6, which further comprises:
   providing a pressure line extending from the at least one pump to the at least one injector;
   providing a return line branching off from the pressure line; and
   carrying out degasification through the return line when the number of delivery movements is greater than a second limiting value and otherwise carrying out degasification through the at least one injector.

9. The method according to claim 5, which further comprises bleeding the metering device if air has been detected in the metering device.

10. The method according to claim 4, which further comprises determining a gas quantity in the metering device using the number of delivery movements.

11. The method according to claim 10, which further comprises bleeding the metering device if air has been detected in the metering device.

12. The method according to claim 10, which further comprises:
   providing a pressure line extending from the at least one pump to the at least one injector;
   providing a return line branching off from the pressure line; and
   carrying out degasification through the return line when the number of delivery movements is greater than a second limiting value and otherwise carrying out degasification through the at least one injector.

13. The method according to claim 4, which further comprises bleeding the metering device if air has been detected in the metering device.

14. The method according to claim 1, which further comprises:

determining a speed of the movable pump element in step b); and using the speed of the movable pump element in step d) to determine a pressure in the metering device.

15. A metering device for delivering a liquid additive out of a tank into an exhaust gas treatment device, the metering device comprising:
- at least one pump having a pressure side and having a movable pump element performing delivery movements to deliver the liquid additive;
- at least one injector configured to be opened to meter the liquid additive;
- a pressure line interconnecting said at least one injector and said pressure side of said at least one pump; and
- a controller configured to carry out the following steps:
  - a) open said at least one injector during an opening time;
  - b) meter liquid additive and count a number of said delivery movements during metering;
  - c) close said at least one injector;
  - d) compare said number of said delivery movements ascertained in step b) with said opening time of said at least one injector between step a) and step c) to diagnose operation of the metering device; and
  - e) correcting at least one operating parameter of the metering device dependent on the comparison in step d).

16. A motor vehicle, comprising:

an internal combustion engine;

an exhaust gas treatment device configured to clean exhaust gases of said internal combustion engine;

a tank for a liquid additive; and a metering device according to claim 15 configured to feed the liquid additive in a metered manner out of said tank into said exhaust gas treatment device.

* * * * *